(12) United States Patent
Warkentin

(10) Patent No.: US 7,341,140 B1
(45) Date of Patent: Mar. 11, 2008

(54) OFF-LOADING CONVEYOR OF PRODUCE

(76) Inventor: A. James Warkentin, 13551 View Dr., Orange Cove, CA (US) 93646

( * ) Notice: Subject to any disclaimer, the term of this patent is extended or adjusted under 35 U.S.C. 154(b) by 0 days.

(21) Appl. No.: 11/056,335

(22) Filed: Feb. 11, 2005

(51) Int. Cl.
*B65G 17/16* (2006.01)
(52) U.S. Cl. .............. 198/370.04; 198/360; 198/369.2; 198/369.3; 198/802; 198/808; 414/419; 414/422; 414/425; 209/648; 209/698
(58) Field of Classification Search ........... 198/370.04, 198/360, 369.2, 369.3, 802, 808; 414/425, 414/419, 422; 209/698, 648
See application file for complete search history.

(56) References Cited

U.S. PATENT DOCUMENTS

| | | | | |
|---|---|---|---|---|
| 2,360,661 A | * | 10/1944 | Eddy et al. ................... 193/36 |
| 3,642,113 A | * | 2/1972 | Burgis ................... 198/370.09 |
| 4,033,450 A | * | 7/1977 | Paddock et al. ........ 198/867.08 |
| 4,106,628 A | * | 8/1978 | Warkentin et al. .......... 209/556 |
| 4,961,489 A | * | 10/1990 | Warkentin ............. 198/370.04 |
| 5,018,864 A | | 5/1991 | Richert et al. .............. 356/635 |
| 5,029,692 A | | 7/1991 | Warkentin ............. 198/370.02 |
| 5,101,982 A | * | 4/1992 | Gentili ........................ 209/556 |
| 5,106,195 A | | 4/1992 | Richert et al. .............. 356/407 |
| 5,156,278 A | | 10/1992 | Richert et al. .............. 209/556 |
| 5,181,596 A | | 1/1993 | Warkentin ............. 198/370.05 |
| 5,195,628 A | | 3/1993 | Warkentin ................... 198/370 |
| 5,215,179 A | | 6/1993 | Warkentin ................... 198/365 |
| 5,223,917 A | | 6/1993 | Richert et al. .............. 356/407 |
| 5,286,980 A | | 2/1994 | Richert et al. ........... 250/559.2 |
| 5,401,954 A | | 3/1995 | Richert et al. ............... 250/226 |
| 5,474,167 A | | 12/1995 | Warkentin ................ 198/890.1 |
| 5,477,955 A | * | 12/1995 | Madden et al. ........ 198/370.04 |
| 5,611,419 A | * | 3/1997 | LaVars ................... 198/370.04 |
| 5,677,516 A | * | 10/1997 | Leverett ....................... 177/52 |
| 5,878,863 A | * | 3/1999 | Madden et al. ........ 198/370.04 |
| 5,988,351 A | | 11/1999 | Warkentin ............. 198/370.04 |
| 6,369,892 B2 | | 4/2002 | Richert et al. .............. 356/402 |
| 6,400,833 B1 | | 6/2002 | Richert et al. .............. 382/110 |

* cited by examiner

*Primary Examiner*—Gene O Crawford
*Assistant Examiner*—Leslie A Nicholson, III
(74) *Attorney, Agent, or Firm*—Connolly Bove Lodge & Hutz LLP

(57) ABSTRACT

An off-loading conveyor of produce having utility in the discrimination and separation of watermelons includes a support structure defining a conveying path, an endless flexible element mounted on the support structure to extend and to move along the conveying path and support elements mounted to pivot from the conveying path and to move with the endless flexible element along the conveying path. The support elements are mounted to mounts which are attached to the endless flexible element. These elements are pivotally mounted to the mount and extend transversely across the conveying path of the conveyor from pivots in alternation from opposite sides of the conveying path. The support elements include elongate bodies which are pivoted adjacent one end and employ a rotatably mounted wheel adjacent the other end. The wheels define a conveying channel and are able to be lifted by cams upwardly to off load produce from either side of the conveyor.

13 Claims, 5 Drawing Sheets

OFF-LOADING CONVEYOR OF PRODUCE

BACKGROUND OF THE INVENTION

The field of the present invention is conveyors for produce and particularly those which include components for off loading selected units of produce therefrom.

Produce handling for the discrimination and separation of product units has long been undertaken. Such discrimination has been based on size, ripeness, color, blemishes and the like. Until recent times, this activity was generally undertaken by manual labor. The versatility of workers for handling and processing large amounts and varieties of produce has generally been unsurpassed. Such processing systems generally include conveyors passing work stations where workers were able to distinguish and separate produce units. Such labor was generally inexpensive and seasonal. However, difficulties in finding experienced seasonal workers and the normal administrative problems associated with the fluctuating work force have long created a need for less labor intensive systems.

More recently, high-speed electronics and sophisticated software have been providing increasing sensing capability for detecting size and condition of individual produce units and rapidly activating responsive mechanisms to separate such units. Such electronic systems are illustrated in U.S. Pat. Nos. 5,018,864; 5,106,195; 5,156,278; 5,223,917; 5,286,980; 5,401,954; 6,369,892; and 6,400,833 to Gerald R. Richert et al. The disclosures of the foregoing patents are incorporated herein by reference. However, such systems require a more exacting placement of the product units than required for manual inspection and separation. Further, such systems are additionally advantaged by operational features allowing orientation and reorientation of product units and means for quickly but gently separately off-loading units one from another. The demands for such exacting placement, control and orientation are more stringent than for manual processing.

Conveying systems generally capable of presenting produce in appropriate orientations and reorientations and having means for selectively off loading produce units without damage are disclosed in U.S. Pat. Nos. 5,029,692; 5,181,596; 5,195,628; 5,215,179; 5,474,167; and 5,988,351 to A. James Warkentin. The disclosures of the foregoing patents are incorporated herein by reference.

The foregoing conveying systems have great utility across a wide range of produce. The systems have found utility in sizes ranging from cherry tomatoes to melons. However, the substantial size of produce such as watermelons are not as conveniently processed on such equipment and require a great deal of room because of the individual unit size and structural support for the weight.

SUMMARY OF THE INVENTION

The present invention is directed to an off-loading conveyor system capable of handling produce of substantial size and to do so in a reasonably compact space. To this end, a conveyor capable of off loading to either side of the conveying path with substantial pivotally mounted elements is contemplated. The conveyor includes a support structure defining the conveying path. An endless flexible element is on the support structure and extends to move along the conveying path. Support elements are mounted to pivot from the conveying path and to move with the endless flexible element along the conveying path.

In a first separate aspect of the present invention, the support elements each include an elongate body, a pivot adjacent one end of the elongate body and an upward protrusion adjacent the other end of the elongate body. The elongate bodies extend transversely across the conveying path from pivots in alternation from opposite sides of the conveying path.

In a second separate aspect of the present invention, the support elements define a conveying channel sized for the conveyance of watermelons.

In a third separate aspect of the present invention, the support elements include protrusions which are defined by wheels rotatably mounted thereto.

In a fourth separate aspect of the present invention, parallel rails associated with the support structure to either side of the conveying path stabilize the support elements.

In a fifth separate aspect of the present invention, any of the foregoing separate aspects are contemplated to be employed together to further advantage.

Accordingly, it is an object of the present invention to provide an improved conveying system for produce. Other objects and advantages will appear hereinafter.

DETAILED DESCRIPTION OF THE PREFERRED EMBODIMENT

Figure 1:
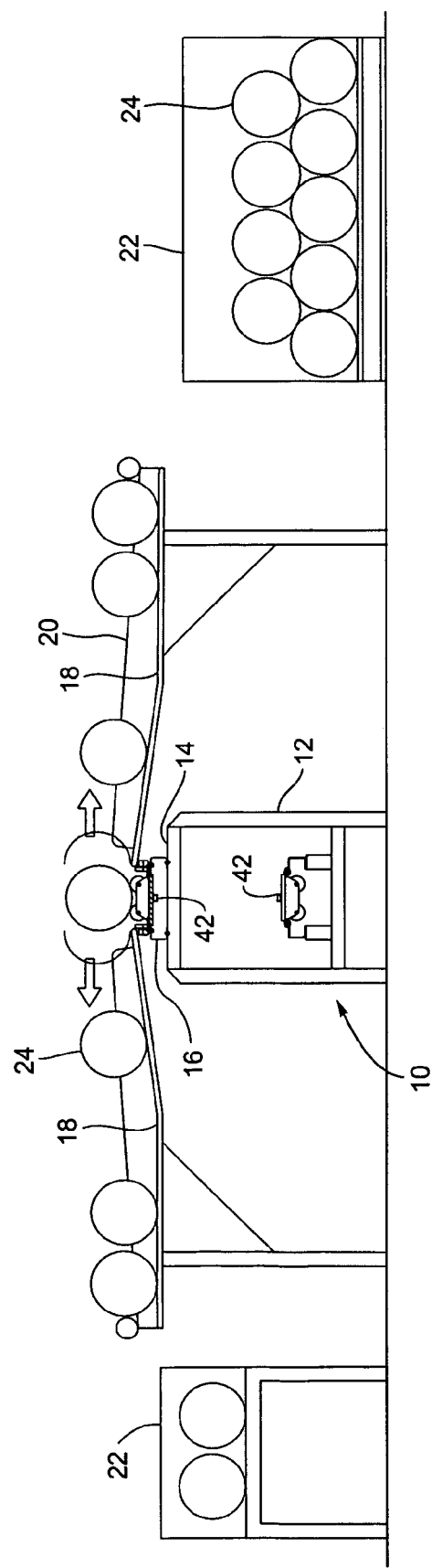
FIG. 1 is an end view showing the layout of a sorting system.
Figure 2:
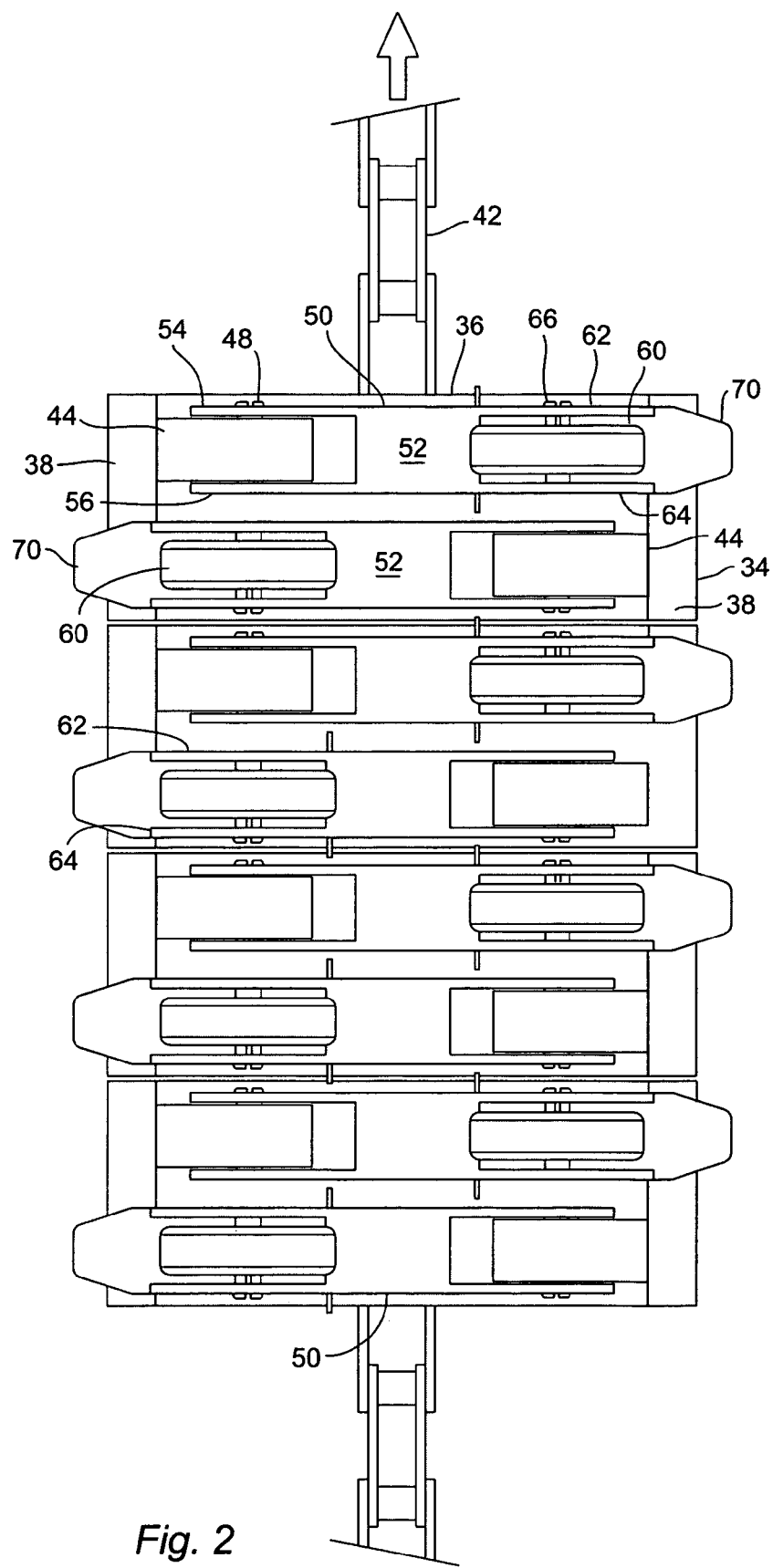
FIG. 2 is a plan view of an endless flexible element with support elements thereon.

Turning in detail to the Figures, an off-loading conveyor of produce is illustrated in FIG. 1 as having a support structure, generally designated 10, with a structural frame 12 having a supporting plate 14 and parallel rails 16. Off-loading trays 18 extend to either side of the support structure 10 and have vertical walls 20 to separate portions of the trays to define bins for separate grades of produce. Containers 22 are positioned for off loading from the trays 18. Watermelons 24 are shown to move from the central conveying path outwardly in both directions to the trays 18.

Figure 4:
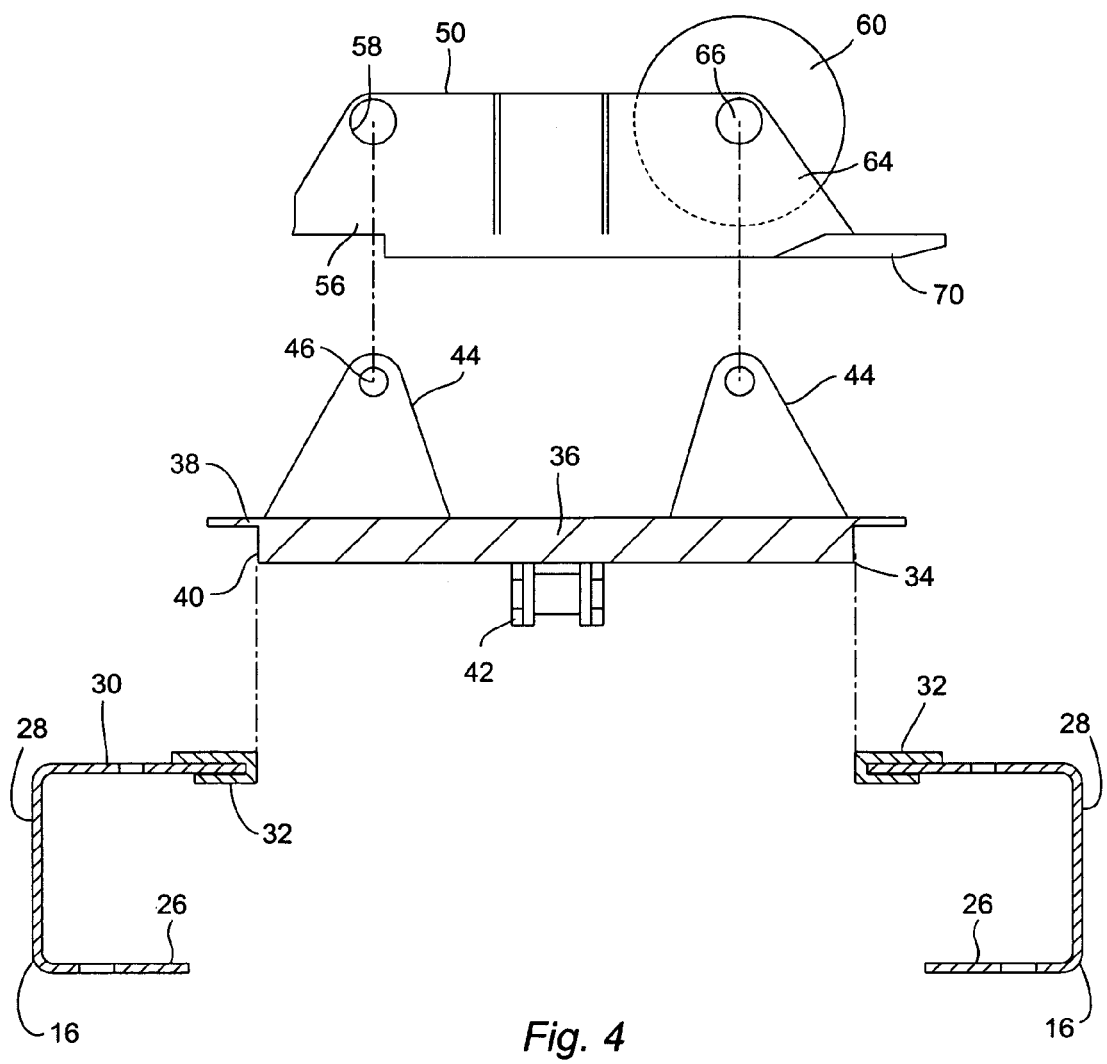
FIG. 4 is an exploded end view of a support element, a mount and parallel rails.
Figure 5:
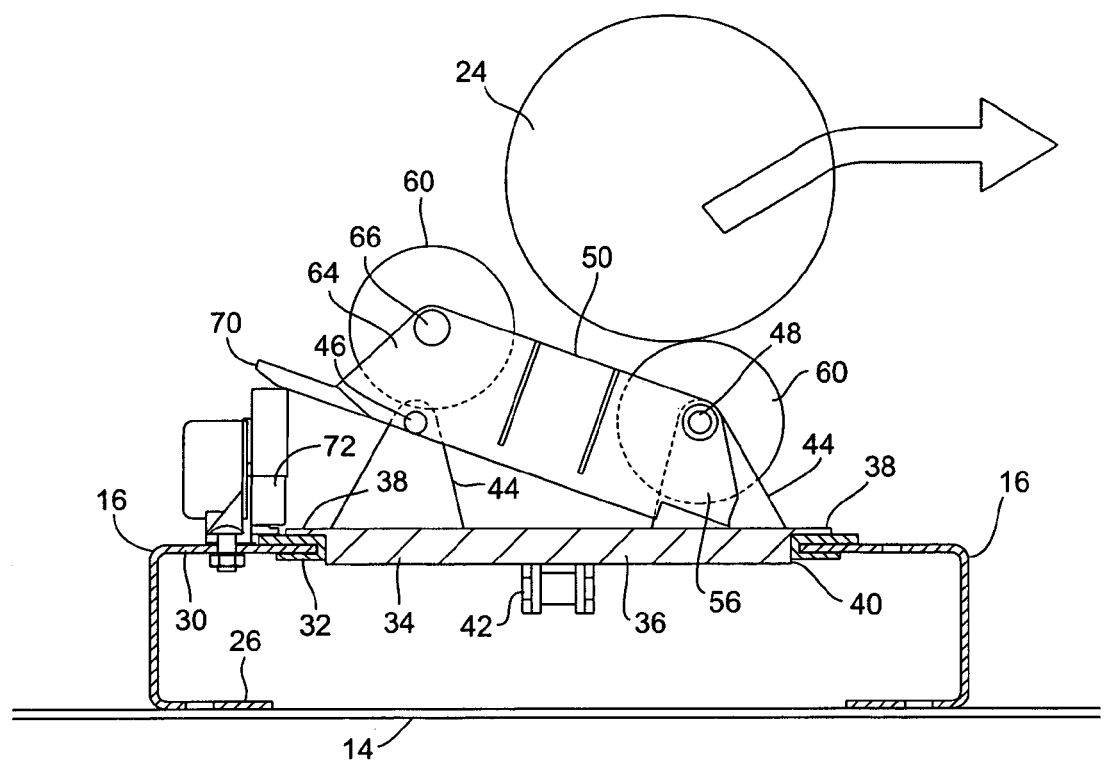
FIG. 5 is a cross-sectional view taken transversely to the conveying path of the off-loading system actuated for the off loading of a produce unit toward the right.
Figure 6:
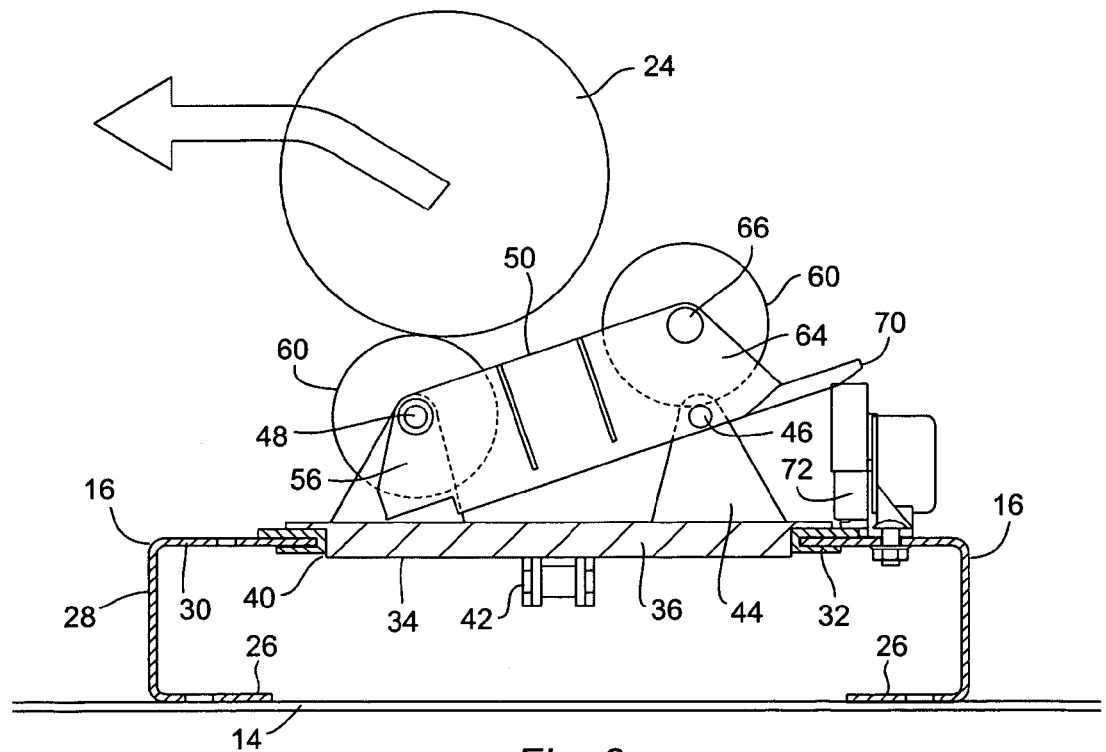
FIG. 6 is a cross-sectional view taken transversely to the conveying path of the off-loading system actuated for the off loading of a produce unit toward the left.

The parallel rails 16 are illustrated in greater detail in FIGS. 4 through 6. The rails 16 are formed as channels. Each channel has a first leg 26 bolted or otherwise affixed to the supporting plate 14 of the support structure 10. The channel web 28 provides displacement from the supporting plate 14. A second leg 30 extends inwardly with the end thereof covered with a low friction plastic extrusion 32. These extrusions 32 form the bearing surfaces to define the conveying path of the conveyor.

Mounts 34 are slidably positioned on the extrusions 32. The mounts 34 each have a body 36 which is rectangular in plan and vertical cross section. Flanges 38 extend from the upper surface of the body 36 to define sliding surfaces to rest on the extrusions 32 of the rails 16. Shoulders 40 adjacent the flanges 38 fit within the extrusions 32 for lateral constraint. There are a multitude of mounts 34 attached to an endless flexible element 42 which is commonly provided by a roller chain which extends in part along the conveying path. The mounts 34 are affixed to the endless flexible element 42 with legs attached to the plates between rollers on the roller chain. Along the conveying path, the endless flexible element 42 is supported by the mounts 34 which in turn slide along the parallel rails 16.

Figure 3:
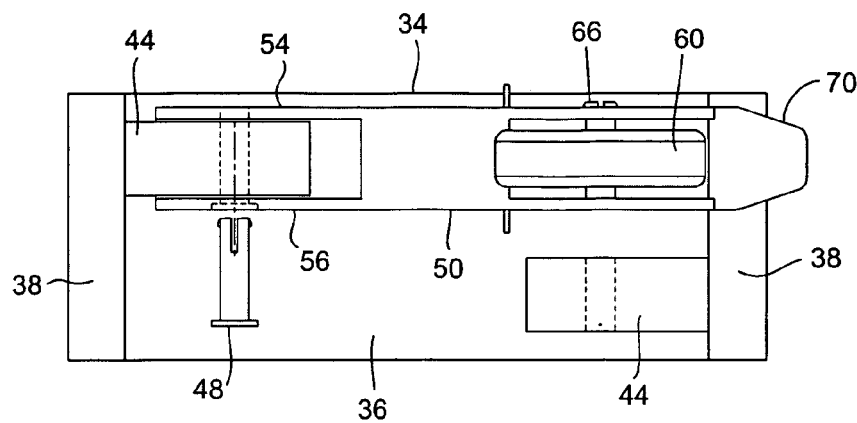
FIG. 3 is a plan view of a mount in partial assembly.

The mounts 34 each include two posts 44 extending from one surface of the body 36 on the opposite side from the attachment of the endless flexible element 42. The posts include mounting holes 46 to receive pivot pins 48. The posts 44 are displaced from one another along the direction of the conveying path and are also displaced from one another laterally of the conveying path, as is best illustrated in FIG. 3.

Support elements, generally designated 50, include an elongate body 52 extending transversely across the conveying path. The elongate body 52 includes mounting plates 54, 56 which each include a hole 58 defining a pivot for receiving the pin 48 associated with the post 44. Assembled, the support elements 50 are mounted to pivot from the conveying path and to move with the endless flexible element along the conveying path through the pivotal attachment to the mounts 34. The pivot 58 is adjacent one end of the elongate body 52. A wheel 60 is pivotally mounted between attachment plates 62, 64 by a pin 66 adjacent the other end of the elongate body 52.

The support elements 50 are arranged to extend transversely across the conveying path in alternation from the posts 44 on opposite sides of the conveying path. The wheels 60 define upward protrusions which in aggregate form a conveying channel along the conveying path and are spaced appropriately for the conveyance of watermelons 24.

A cam follower 70 extends from the opposite end of the elongate body 52 from the pivot 58 on each support element 50. This cam follower extends laterally outwardly of the mounts 34 to move parallel to the conveying path. Because of the alternating arrangement of the support elements 50, these followers 70 extend from either side of the conveyor assembly.

Figure 7:
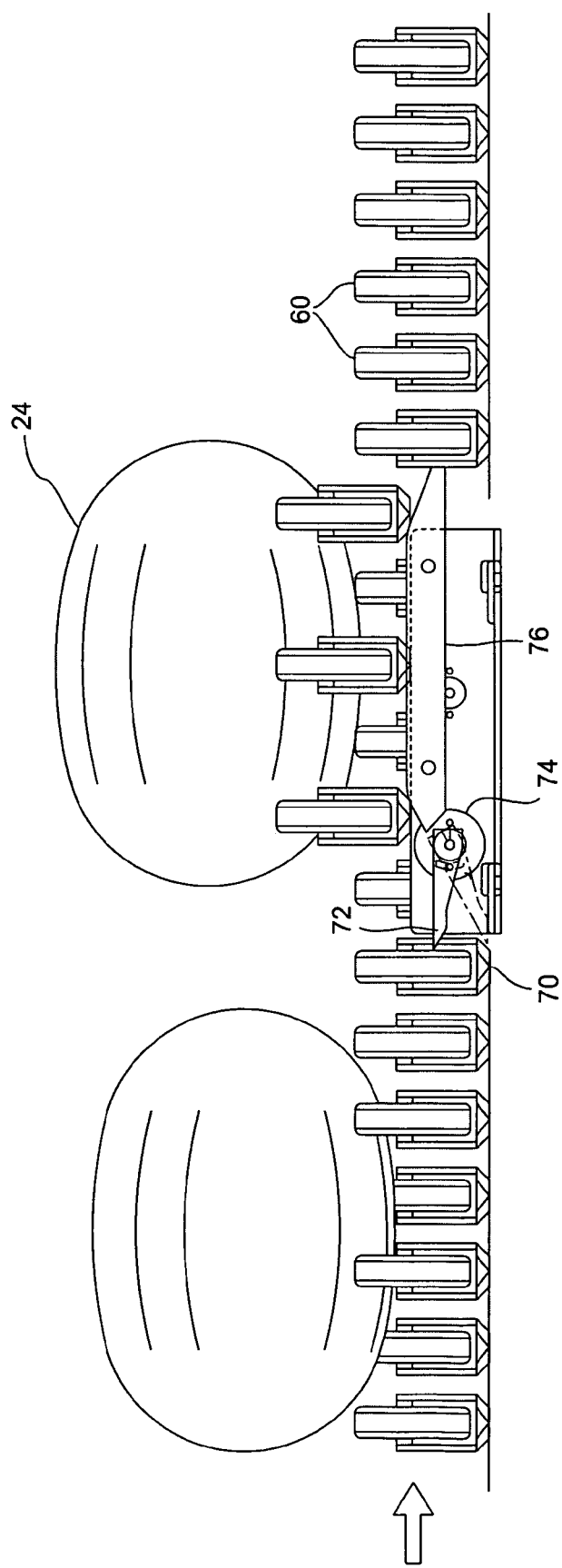
FIG. 7 is a side view of the conveying path with watermelons thereon.

FIGS. 5 through 7 illustrate cams 72 which are selectively movable into the paths of travel of the cam followers 70. A cam 72 is illustrated in two positions in FIG. 7. A driver 74 rotates the cam 72 downwardly to pick up the cam follower 70 to lift it up onto and over a lifter rail 76 as best illustrated in FIG. 7.

In operation, watermelons are singulated and advanced to the off-loading conveyor with the conveyor running. The conveyor path preferably extends beneath an electronic device for measuring the watermelons for various selected physical attributes. The grading system can then actuate the drivers of the cams 72 at appropriate intervals to off load watermelons 24 from the conveyor. The watermelons are cradled between multiple wheels 60 to either side of the conveying channel. The watermelons can be rotated about an axis parallel to the conveying path if more complete inspection is desired.

At the selected point, the cam 72 extends downwardly to engage the upcoming cam follower 70 to lift alternate ones of the wheels 60 upwardly to a degree that the watermelons being processed will reliably off load from the conveyor. Typically the center of gravity of the watermelon is taken over the stationary rollers so that the melon will naturally continue to the off-loading tray. It is not necessary that the watermelon always be lifted to the point that the center of gravity will cross over the other rollers because of the momentum imparted by the uplifting rollers which will assist the watermelon in traveling toward the trays.

These rollers 60 and the associated stable platform defined by the parallel rails 16 accommodate the substantial size of watermelons. Further, the ability to off load in both directions has the capability of considerably shortening the overall length of the conveyor without compromising the number of bins which can be selected.

Thus, an off-loading conveyor for watermelons has been disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. Off-loading conveyor of produce along a conveying path, comprising
   an endless flexible element extending to move along the conveying path;
   support elements mounted to pivot from the conveying path and to move with the endless flexible element along the conveying path, each support element including
      an elongate body,
      a pivot adjacent a first end of the elongate body and
      an upward protrusion adjacent a second end of the elongate body, the elongate bodies being centered on and extending transversely across the conveying path from the pivots, the pivots being alternately on opposite sides of the conveying path to support the produce centrally on the conveying path;
   mounts fixed to the endless flexible element, the mounts including posts and pivot pins extending through the posts, respectively, and receiving the pivots, respectively;
   parallel rails to either side of the conveying path, the mounts slidably engaging the rails.

2. The off-loading conveyor of claim 1, the upward protrusions forming a conveying channel along the length of the conveying path.

3. The off-loading conveyor of claim 2, the conveying channel being sized for the conveyance of watermelons.

4. The off-loading conveyor of claim 1, the upward protrusions being wheels rotatably mounted adjacent the second end about axes parallel to the conveying path.

5. The off-loading conveyor of claim 1, the support elements each further including
   a cam follower extending from the second end, the cam followers to move in paths of travel parallel to and to either side of the conveying path.

6. The off-loading conveyor of claim 5 further comprising cams selectively movable into the paths of travel of the cam followers.

7. Off-loading conveyor of produce along a conveying path, comprising
   an endless flexible element extending to move along the conveying path;
   support elements mounted to pivot from the conveying path and to move with the endless flexible element along the conveying path, each support element including
      an elongate body,
      a pivot adjacent a first end of the elongate body and a wheel rotatably mounted adjacent a second end of the elongate body about an axis parallel to the conveying path, the elongate bodies being centered on and extending transversely across the conveying path from the pivots, the pivots being alternately on opposite sides of the conveying path, the wheels forming a conveying channel along the length of the conveying path to support the produce centrally on the conveying path;

mounts fixed to the endless flexible element, the mounts including
posts and
pivot pins extending through the posts, respectively, and receiving the pivots, respectively;
parallel rails, the mounts slidably engaging the rails.

8. The off-loading conveyor of claim 7, the conveying channel being sized for the conveyance of watermelons.

9. Off-loading conveyor of produce along a conveying path, comprising an endless flexible element extending to move along the conveying path;

support elements mounted to pivot from the conveying path and to move with the endless flexible element along the conveying path, each support element including
an elongate body,
a pivot adjacent a first end of the elongate body and
an upward protrusion adjacent a second end of the elongate body, the elongate bodies being centered on and extending transversely across the conveying path from the pivots, the pivots being alternately on opposite sides of the conveying path to support the produce centrally on the conveying path;

mounts fixed to the endless flexible element, the mounts including
posts and
pivot pins extending through the posts, respectively, and receiving the pivots, respectively;

parallel rails to either side of the conveying path, the mounts slidably engaging the rails.

10. The off-loading conveyor of claim 9, the upward protrusions forming a conveying channel along the length of the conveying path.

11. The off-loading conveyor of claim 10, the conveying channel being sized for the conveyance of watermelons.

12. An off-loading conveyor of produce, comprising an endless flexible element extending to move longitudinally;

support elements arranged in a row with each mounted to move with the endless flexible element and to pivot relative to the endless flexible element, each support element including
an elongate body extending transversely of the endless flexible element,
a pivot adjacent a first end of the elongate body and
a protrusion adjacent a second end of the elongate body, the support elements each having the pivot next to the protrusion of the next adjacent support element in the row and the protrusion next to the pivot of the next adjacent support element in the row, the protrusions adjacent the second end of the elongate bodies forming a conveying channel centered over and extending along the endless flexible element;

mounts fixed to the endless flexible element, the pivots of the elongate bodies being rotatably mounted to the mounts, respectively;

parallel rails to either side of the endless flexible element, the mounts being supported by the parallel rails.

13. The off-loading conveyor of claim 12, the protrusions adjacent the second end of the elongate bodies being wheels rotatably mounted relative to the elongate bodies about axes parallel to the row.

* * * * *